United States Patent [19]

Brown

[11] 4,247,152
[45] Jan. 27, 1981

[54] WHEEL COVER RETENTION

[75] Inventor: Trevor J. Brown, Rochester, Mich.

[73] Assignee: General Motors Corporation, Detroit, Mich.

[21] Appl. No.: 104,320

[22] Filed: Dec. 17, 1979

[51] Int. Cl.³ .............................................. B60B 7/00
[52] U.S. Cl. .................................. 301/37 R; 301/37 P; 24/73 HC
[58] Field of Search ............... 301/37 R, 37 P, 37 TP, 301/37 PB, 37 B, 108 R, 108 A; 24/73 HC, 73 B

[56] References Cited

U.S. PATENT DOCUMENTS

| | | | |
|---|---|---|---|
| 3,771,834 | 11/1973 | Kretschmer | 301/37 P |
| 3,788,707 | 1/1974 | Connell | 301/37 P |
| 3,794,385 | 2/1974 | Kretschmer | 301/37 P |
| 3,873,161 | 3/1975 | Kretschmer | 301/37 P |
| 3,970,346 | 7/1976 | Kretschmer | 301/37 R |
| 4,003,604 | 1/1977 | Connell | 301/37 CD |
| 4,093,312 | 6/1978 | Kretschmer | 301/37 R |

*Primary Examiner*—H. Grant Skaggs
*Attorney, Agent, or Firm*—Herbert Furman

[57] ABSTRACT

A plastic wheel cover is provided with a plurality of recesses opening to a flange of the wheel and the tire bead when the cover is assembled to the wheel. Each recess houses a generally C-shaped clip having a body portion fitting within the opening of the recess and return bent leg portions locked between end walls of the recess and a transverse intermediate wall. Axially spaced rows of teeth on the body portion engage the tire bead and flange of the wheel to retain the cover to the wheel.

4 Claims, 5 Drawing Figures

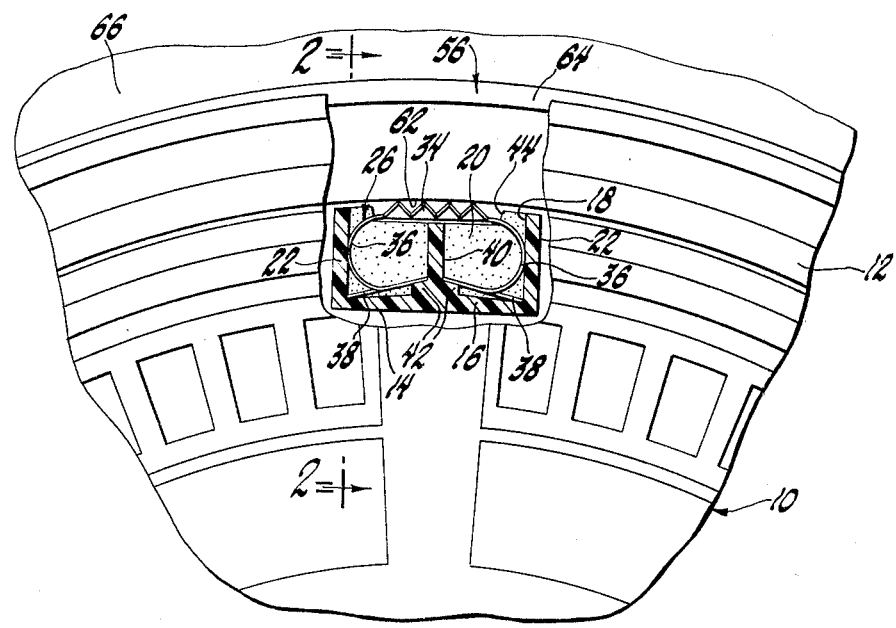
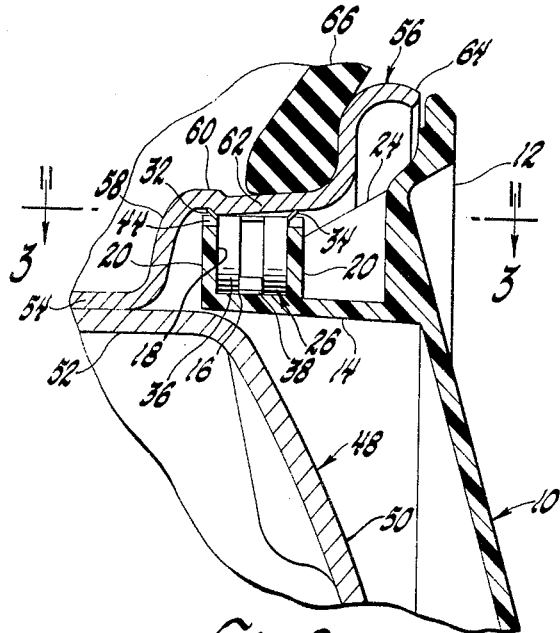
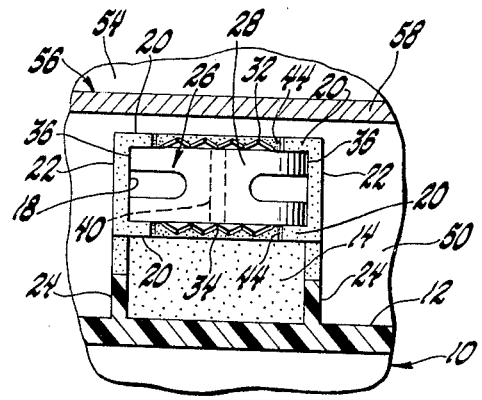
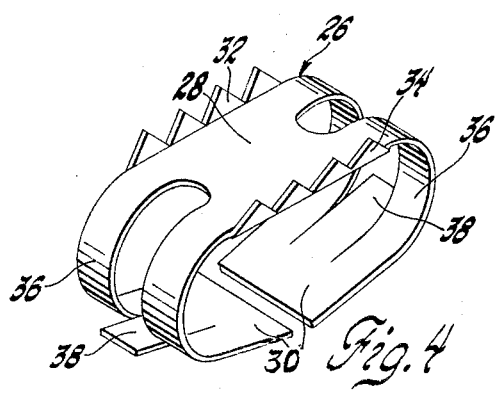
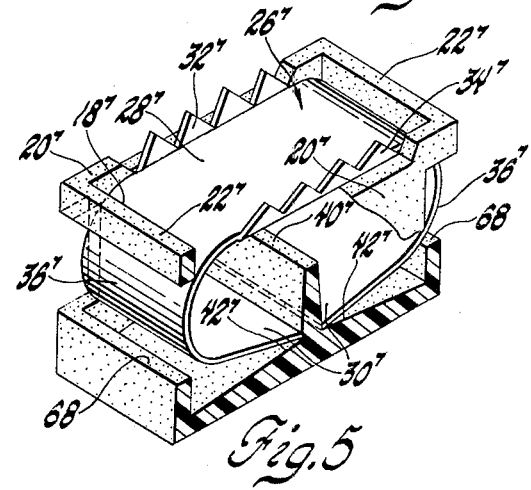

WHEEL COVER RETENTION

This invention relates generally to vehicle wheel covers and more particularly to an improved wheel cover retention for self-retaining plastic wheel covers on a vehicle wheel.

The retention of plastic wheel covers on a vehicle wheel by the use of clips locked within axially elongated recesses of the cover is known. This type of retention is in current production use and generally comprises a clip having a U-shaped body which is locked within a recess and a flexible leg extending over the body and recess for radial flexing movement relative thereto and engagement with a juxtaposed flange of the wheel.

The retention of this invention generally includes a clip which is self-retained within a recess of the cover and resiliently engages the wheel for retaining the cover thereon. In the preferred embodiment of the invention, the wheel cover is provided with a plurality of generally circumferentially elongated recesses opening to both a flange of the wheel and the tire bead when the cover is assembled to the wheel. Each recess houses a generally C-shaped clip, with the body portion of the clip being fitted within the opening of the recess and the return bent leg portions thereof extending between the circumferentially spaced end walls of the recess and a transverse intermediate wall between the axially spaced side walls. The legs are locked between the transverse wall and the end walls and resiliently support the body portion for radial movement relative to the opening of the recess. The body portion is provided with a pair of axially spaced rows of teeth, one row bitingly gripping an axially extending flange of the wheel and the other row lockingly gripping the tire bead to thereby retain the cover on the wheel.

One of the features is that the body portion of the clip is resiliently radially supported by the leg portions and is limited only to radial movement relative to the wheel within the recess to thereby avoid any axial creeping of the clip relative to the wheel. Another feature is that the one row of teeth which bites into the axial flange of the wheel resists both radial and axial movement of the cover relative to the wheel and that the other row of teeth which locks into the tire bead resists axial movement of the cover relative to the wheel. A further feature is that the clip has a low spring rate and a high load to thereby provide for a long useful life. Yet another feature is that the locking of the return bent leg portions of the clip within the recess permits radial movement only of the body portion of the clip to ensure that the axially spaced rows of teeth move with the wheel as the wheel deflects rather than moving relative to such wheel during such wheel deflection.

These and other features of the invention will be readily apparent from the following specification and drawings wherein:

FIG. 1 is a partial broken-away, rear elevational view of a plastic wheel cover embodying a wheel cover retention according to one embodiment of the invention;

FIG. 2 is a sectional view taken generally along the plane indicated by line 2—2 of FIG. 1;

FIG. 3 is a view taken generally along the plane indicated by line 3—3 of FIG. 2;

FIG. 4 is a perspective view of the clip;

FIG. 5 is a partial perspective view of a second embodiment of the invention.

Referring now to FIGS. 1 to 4 of the drawings, a vehicle wheel cover 10 of molded plastic includes a decorative outer face as shown in FIG. 1 and an outer circumferential peripheral area 12. As best shown in FIGS. 2 and 3, an integral radially facing flange 14 extends axially from the peripheral area 12 of the cover. The flange 14 forms the support as well as the base wall 16 of a pocket or recess designated generally 18 which includes axially spaced circumferentially extending arcuate side walls 20 and circumferentially spaced axially extending end walls 22, all such walls being formed integral with each other and the wall 16. The flange 14 is reinforced against radial movement relative to the cover by a pair of integral tapered walls 24 extending between the peripheral area 12 and walls 22 as shown in FIG. 2.

The cover 10 is provided with a number of like recesses 18 about its peripheral area 12. Generally, four such recesses are sufficient. Although an integral recess 18 has been disclosed, it will be understood that the recess may be separately molded and attached in various conventional manners to a suitable flange structure on the peripheral area 12.

A generally C-shaped retainer or clip 26, best shown in FIG. 4, is mounted within the recess 18 for engagement with an annular flange and tire bead of a vehicle wheel as will be described. The clip 26 is formed of spring steel and includes a body portion 28 and a pair of return bent leg portions 30. The body portion 28 is generally planar as shown in FIG. 1 and the axially spaced side edges thereof are provided with a respective integral outwardly angled row of teeth 32 and 34. The number of and shape of the teeth of each row may be varied as desired. The body portion 28, arcuate juncture portions 36, and the leg portions 30 are lanced, and the material thereof is formed into circumferentially stiff radially flexible tangs 38 which act to retain the clip 26 in the recess 18 as will now be described. A transverse wall 40 integrally joins walls 20 and is integrally joined to wall 16 by ribs 42 having a radially outer tapered surface. When the clip is inserted within the recess, the leg portions 30 are deflected inwardly of the clip toward the body portion 28 and the tangs 38 are deflected outwardly as the edges thereof respectively move along wall 40 and walls 22. When the clip is fully inserted, the leg portions 30 seat on ribs 42 and are thereby located angularly of wall 16. The leg portions and the tangs 38 are generally coplanar and the edges thereof respectively engage wall 40 adjacent ribs 42 and walls 22 adjacent wall 16 to wedgingly retain the clip in the recess. The juncture portions 36 are resiliently engaged with respective walls 22 and resiliently support the body portion 28 within the recess slightly below walls 20. Such walls are cut away at 44 generally axially opposite the adjacent angled rows of teeth.

Since the leg portions 30 and tangs 38 are tightly wedged between the walls 22 and the wall 40, they are generally fixed against movement. However, the arcuate juncture portions 36 resiliently support the body portion 28 and the rows of teeth 32 and 34 for movement inwardly and outwardly of the recess 18, radially of the wheel, while preventing any movement of the body portion laterally of the recess, axially of the wheel.

As shown in FIG. 2, a conventional vehicle wheel designated generally 48 includes a hub portion 50 having an axial flange or skirt 52 which is riveted or welded to the drop center flange 54 of a conventional rim 56. Flange 54 merges across an arcuate juncture into a radial flange 58 which in turn merges across a tire bead 60 into an axially extending radially facing retention flange 62 which in turn merges into a terminal flange 64. Flange 62 provides a seat for the tire 66 and also cooperates with the tire bead 60 in retaining the cover 10.

When the cover 10 is assembled on the wheel 48, the row of teeth 34 bitingly engages flange 62 to retain the cover against both axial and radial movement while the row of teeth 32 engages within the tire bead 60 to lockingly retain the cover against axial movement.

The resilient support of the body portion 28 by the juncture portions 36 permits the body portion to move radially with respect to the tire bead 60 and flange 62 in order to effect assembly and removal of the cover. During rotation of the wheel, the flange 62 continuously flexes. The flexing movement between the wheel and cover is easily accommodated by radial movement of the body portion 28 of the clip inwardly and outwardly of the recess 18 relative to the juncture portions 36. The juncture portions 36 prevent any axial component in the movement of the body portions. This effectively prevents any relative movement between the rows of teeth 32 and 34 and the wheel and the resultant creeping of the cover relative to the wheel.

FIG. 5 shows a second embodiment of the invention wherein like prime numerals are used for like parts. In this embodiment of the invention, the body portion 28', the juncture portions 36' and the leg portions 30' of clip 26' are not lanced. Instead, the wedging retention of the juncture portions 36' and the leg portions 30' is accomplished by slotting the walls 22' and the walls 20' of recess 18' at 68. The upper edges of slots 68 engage upper arcuate parts of the juncture portions 36' and wedgingly engage the juncture portions and leg portions 30' between the slots 68 and wall 40'. In this embodiment, ribs 42' extend fully between the wall 40' and the walls 22' rather than only partially as in the first embodiment. This embodiment has the advantage of not requiring any slotting of the clip which sometimes can result in localized stress points.

Thus this invention provides an improved wheel cover retention.

The embodiment of the invention in which an exclusive property or privilege is claimed are defined as follows:

1. In combination with a vehicle wheel including a generally axially extending annular flange joined to a tire bead, a wheel cover for covering the wheel and including a plurality of circumferentially elongated recesses juxtaposed to the wheel flange and tire bead, a generally C-shaped spring clip received in each recess and including a circumferentially elongated body portion facing the wheel flange and tire bead and overlying a pair of return bent flanges, said body portion including at least a pair of axially spaced circumferentially extending rows of teeth, one row of teeth bitingly gripping the axially extending wheel flange to limit axial and radial movement of the cover relative to the wheel and the other of said rows lockingly gripping the tire bead to limit axial movement of the cover relative to the wheel, and cooperating means securing the return bent portions to the cover portion within the recess, the body portion being resiliently supported by the junctures thereof to the return bent portions for movement radially of the wheel flange and tire bead.

2. In combination with a vehicle wheel including a generally axially extending annular flange joined to a tire bead, a wheel cover for covering the wheel and including a plurality of circumferentially elongated recesses juxtaposed to the wheel flange and tire bead, each recess including a pair of circumferentially spaced end walls joined by circumferentially extending side walls and a circumferentially extending base wall, a generally C-shaped spring clip received in each recess and including a planar body portion facing the wheel flange and tire bead and overlying a pair of return bent flanges extending along said base wall between said side walls, said body portion including at least a pair of circumferentially extending rows of teeth, one row of teeth bitingly gripping the axially extending wheel flange to limit axial and radial movement of the cover relative to the wheel and the other of said rows gripping the tire bead to limit axial movement of the cover relative to the wheel, and cooperating means on said return bent flanges and said side and base walls for securing said return bent flanges within said recess, said body portion being resiliently supported by the junctures thereof to the return bent portions for movement radially of the wheel flange and tire bead.

3. in combination with a vehicle wheel including a generally axially extending annular flange joined to a tire bead, a wheel cover for covering the wheel and including a plurality of circumferentially elongated recesses juxtaposed to the wheel flange and tire bead and each recess including a pair of circumferentially spaced end walls joined by circumferentially extending side walls and a transverse wall intermediate the end walls, a generally C-shaped spring clip received in each recess and including a body portion overlying the intermediate wall and a pair of return bent flange portions, each located between the intermediate wall and a respective end wall, cooperating means on each return bent portion and a respective end wall for wedging each return bent portion between the intermediate wall and a respective end wall, said body portion facing said wheel flange and tire bead, and including at least a pair of circumferentially extending rows of teeth, one row of teeth bitingly gripping the axially extending wheel flange to limit axial and radial movement of the cover relative to the wheel and the other of said rows lockingly gripping the tire beead to limit axial movement of the cover relative to the wheel, said body portion being resiliently supported by the arcuate junctures thereof to the return bent portions for movement radially of the wheel flange and tire bead.

4. In combination with a vehicle wheel including a generally axially extending annular flange joined to a tire bead, a wheel cover for covering the wheel and including a plurality of circumferentially elongated recesses juxtaposed to the wheel flange and tire bead, each recess including a pair of circumferentially spaced end walls joined by circumferentially extending side walls, and an intermediate transverse wall, a generally C-shaped spring clip received in each recess and including a circumferentially arcuate planar body portion overlying the intermediate wall and a pair of return bent integral flanges, each located between the intermediate wall and a respective end wall, said body portion facing said wheel flange and tire bead and provided with at least a pair of circumferentially extending rows of teeth, one row of teeth bitingly gripping the axially extending wheel flange to limit axial and radial movement of the cover relative to the wheel and the other of said rows gripping the tire bead to limit axial movement of the cover relative to the wheel, the ends of said return bent flanges engaging the recess intermediate wall, and a tab lanced from each return bent flange and engaging a respective recess end wall to wedge each flange between a respective end wall and the intermediate wall and secure the clip within the recess, said body portion being resiliently supported by the arcuate junctures thereof to the return bent portions for movement radially of the wheel flange and tire bead.

* * * * *